(12) United States Patent
DeLuca et al.

(10) Patent No.: US 11,921,872 B2
(45) Date of Patent: Mar. 5, 2024

(54) ACCESS CONTROL FOR A DATA OBJECT INCLUDING DATA WITH DIFFERENT ACCESS REQUIREMENTS

(71) Applicant: International Business Machines Corporation, Armonk, NY (US)

(72) Inventors: Lisa Seacat DeLuca, Bozeman, MT (US); Joseph G. Berti, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 390 days.

(21) Appl. No.: 17/123,779

(22) Filed: Dec. 16, 2020

(65) Prior Publication Data
US 2022/0188440 A1  Jun. 16, 2022

(51) Int. Cl.
*G06F 21/62* (2013.01)
*G06F 30/10* (2020.01)
*G06T 19/20* (2011.01)

(52) U.S. Cl.
CPC .......... *G06F 21/6218* (2013.01); *G06F 30/10* (2020.01); *G06T 19/20* (2013.01)

(58) Field of Classification Search
CPC ...... G06F 21/6218; G06F 30/10; G06T 19/20
USPC ........................................................ 726/26
See application file for complete search history.

(56) References Cited

U.S. PATENT DOCUMENTS 6,085,193 A * 7/2000 Malkin ............... H04L 67/5681
709/200
6,594,671 B1 * 7/2003 Aman ..................... G06F 9/465
8,190,947 B1 * 5/2012 Holl ..................... G06F 11/1435
714/15
8,442,865 B2  5/2013 Wilson et al.
2002/0129001 A1 * 9/2002 Levkoff .................. G06F 30/13
(Continued)

FOREIGN PATENT DOCUMENTS

CN  110502461 A  * 11/2019  ........... G06F 13/374
EP  2979416 B1  * 6/2019  ........... G06F 21/335

OTHER PUBLICATIONS

Deelman. "Grid-based metadata services." In Proceedings. 16th International Conference on Scientific and Statistical Database Management, 2004., pp. 393-402. IEEE, 2004. (Year: 2004).*

(Continued)

*Primary Examiner* — Luu T Pham
*Assistant Examiner* — Walter J Malinowski
(74) *Attorney, Agent, or Firm* — Edell, Shapiro & Finnan, LLC

(57) ABSTRACT

A computer system controls access to data. A request is received from an entity to access data comprising a primary data object corresponding to a physical item. One or more secondary data objects included in the primary data object are identified, wherein the one or more secondary data objects correspond to physical components of the physical item. Access requirements for the primary data object and the one or more secondary data objects are determined. In response to determining that the access requirements are satisfied by the entity, the entity is granted access to the data comprising the primary data object and the one or more secondary data objects. Embodiments of the present invention further include a method and program product for controlling access to data in substantially the same manner described above.

10 Claims, 5 Drawing Sheets

(56) References Cited

U.S. PATENT DOCUMENTS

| | | | |
|---|---|---|---|
| 2003/0229623 A1* | 12/2003 | Chang | H04L 63/08 |
| 2004/0098591 A1* | 5/2004 | Fahrny | G06F 21/64 |
| | | | 713/176 |
| 2004/0249822 A1* | 12/2004 | Keohane | G06F 16/986 |
| | | | 707/E17.118 |
| 2005/0049886 A1 | 3/2005 | Grannan et al. | |
| 2005/0108546 A1* | 5/2005 | Lehew | H04L 63/06 |
| | | | 713/182 |
| 2005/0229170 A1* | 10/2005 | Bellantoni | G06F 30/33 |
| | | | 717/165 |
| 2006/0036754 A1* | 2/2006 | Itoh | H04L 67/561 |
| | | | 709/230 |
| 2006/0059211 A1* | 3/2006 | Futatsugi | G06F 16/289 |
| 2008/0285527 A1* | 11/2008 | Sammarco | H04L 67/306 |
| | | | 370/338 |
| 2009/0070338 A1* | 3/2009 | Spitzig | G06Q 10/10 |
| 2009/0094667 A1* | 4/2009 | Habeck | G06F 21/6218 |
| | | | 726/1 |
| 2010/0217783 A1* | 8/2010 | Farver | G06F 16/26 |
| | | | 707/805 |
| 2011/0047428 A1* | 2/2011 | Kikta | G06F 11/263 |
| | | | 714/E11.169 |
| 2013/0205229 A1* | 8/2013 | Post | H04L 51/04 |
| | | | 715/758 |
| 2014/0090085 A1* | 3/2014 | Mattsson | G06F 16/176 |
| | | | 726/28 |
| 2014/0298405 A1* | 10/2014 | Qureshi | H04L 67/02 |
| | | | 726/1 |
| 2017/0185628 A1* | 6/2017 | Zakwieja | G06F 16/178 |
| 2017/0220689 A1* | 8/2017 | McCann | G06F 16/2462 |
| 2017/0323239 A1 | 11/2017 | Johnson et al. | |
| 2018/0288057 A1* | 10/2018 | Varadamma | G06F 21/6218 |
| 2018/0288061 A1* | 10/2018 | Byrne | H04L 63/102 |
| 2019/0025810 A1 | 1/2019 | Chapin et al. | |
| 2019/0043260 A1* | 2/2019 | Anderson | G06V 40/20 |
| 2019/0158270 A1 | 5/2019 | Berti | |
| 2019/0250998 A1* | 8/2019 | Bedadala | G06F 11/1464 |
| 2019/0251575 A1 | 8/2019 | Berti et al. | |
| 2020/0118064 A1* | 4/2020 | Perrella | G06F 16/2246 |
| 2020/0125748 A1* | 4/2020 | Lee | H04L 63/12 |
| 2020/0175181 A1* | 6/2020 | Hughes | G06F 16/288 |
| 2020/0272751 A1* | 8/2020 | Kummer | G06F 9/5083 |
| 2020/0402487 A1* | 12/2020 | Williams | G10H 1/0041 |
| 2021/0133670 A1* | 5/2021 | Cella | G06N 3/044 |
| 2021/0248260 A1* | 8/2021 | Adkins | G06F 21/6281 |
| 2021/0342836 A1* | 11/2021 | Cella | H04L 9/3239 |
| 2021/0390083 A1* | 12/2021 | Chu | G06F 9/546 |
| 2022/0019480 A1* | 1/2022 | Hankinson | G06F 16/2448 |
| 2022/0067233 A1* | 3/2022 | Blackwell | A63F 13/65 |
| 2022/0337661 A1* | 10/2022 | Kumar | G06F 3/0604 |
| 2022/0343339 A1* | 10/2022 | Arora | G06Q 30/018 |
| 2022/0366494 A1* | 11/2022 | Cella | G06Q 30/0201 |
| 2022/0382922 A1* | 12/2022 | Sipcic | G06F 30/20 |

OTHER PUBLICATIONS

Şahin, Serap. "On current trends in security and privacy of cloud computing." In 2013 7th International Conference on Application of Information and Communication Technologies, pp. 1-5. IEEE, 2013. (Year: 2013).*

Viktor, Herna L., Bo Wang, Eric Paquet, and Julie Doyle. "Preserving object-relational databases for the next generations." In 2010 Fifth International Conference on Digital Information Management (ICDIM), pp. 11-18. IEEE, 2010. (Year: 2010).*

Martens, Andreas, Matthias Book, and Volker Gruhn. "A data decomposition method for stepwise migration of complex legacy data. " In Proceedings of the 40th international conference on software engineering: Software engineering in practice, pp. 33-42. 2018. (Year: 2018).*

* cited by examiner

ACCESS CONTROL FOR A DATA OBJECT INCLUDING DATA WITH DIFFERENT ACCESS REQUIREMENTS

BACKGROUND

1. Technical Field

Present invention embodiments relate to data access, and more specifically, to controlling access to data objects with data having different access requirements.

2. Discussion of the Related Art

A digital twin is a data object corresponding to a digital replica of a physical counterpart that can provide a variety of applications, such as modeling of a physical object in order to manage an evolving set of data related to a physical object. A digital twin can be updated by providing data to the digital twin that is collected from its physical counterpart, such as sensor data. As such, a digital twin can be described as an executable virtual model of any living or non-living physical counterpart, including a process, organism, place, system, and/or device.

SUMMARY

According to one embodiment of the present invention, a computer system controls access to data. A request is received from an entity to access data comprising a primary data object corresponding to a physical item. One or more secondary data objects included in the primary data object are identified, wherein the one or more secondary data objects correspond to physical components of the physical item. Access requirements for the primary data object and the one or more secondary data objects are determined. In response to determining that the access requirements are satisfied by the entity, the entity is granted access to the data comprising the primary data object and the one or more secondary data objects. Thus, present invention embodiments control access to data objects that depend on other data objects with different access requirements, accounting for any changes to access requirements.

Various other embodiments of the present invention will now be discussed. In some embodiments, the one or more secondary data objects have different access requirements than the primary data object. Thus, present invention embodiments enable overall access requirements to a primary data object to be determined based not only on the access requirements of the primary data object, but also based on any secondary data objects upon which the primary data object depends. In some embodiments, the primary data object is provided to a content hosting service by a first content provider, and wherein the one or more secondary data objects are provided to the content hosting service by one or more second content provider. Thus, present invention embodiments manage access to data when the data includes differences between both the content providers and the access requirements of included data. In some embodiments, granting the entity access comprises providing an instance of the primary data object, including the one or more secondary data objects, to the entity. Thus, users can access data in order to model physical objects. In some embodiments, in response to granting the entity access, data collected by one or more sensors of the physical item corresponding to the primary data object is received, and the primary data object is updated with the received data. Thus, users can access data to manage, track, and test physical objects in real-time. In some embodiments, the one or more secondary data objects are further included in a third data object, and wherein satisfaction, by the entity, of the access requirements for the one or more secondary data objects in order to access the primary data object causes access requirements, for the one or more secondary data objects, to access the third data object to be satisfied. Thus, present invention embodiments control access to data when there are complex relationships among the dependencies. In some embodiments, satisfying the access requirements of the one or more secondary data objects causes the entity to satisfy access requirements for the one or more secondary data objects in a predetermined number of additional data objects in which the one or more secondary data objects are included. Thus, present invention embodiments enable a user to access data by automatically satisfying an access requirement for other data objects when the user has previously satisfied an access requirement for a contained data object. In some embodiments, the access requirements for the one or more secondary data objects are determined to have been modified, and the access requirements for the primary data object and the one or more secondary data objects are automatically updated. Thus, present invention embodiments automatically update access requirements of any affected data objects when content providers make changes to a related data object.

BRIEF DESCRIPTION OF THE DRAWINGS

Generally, like reference numerals in the various figures are utilized to designate like components.

DETAILED DESCRIPTION

Figure 1:
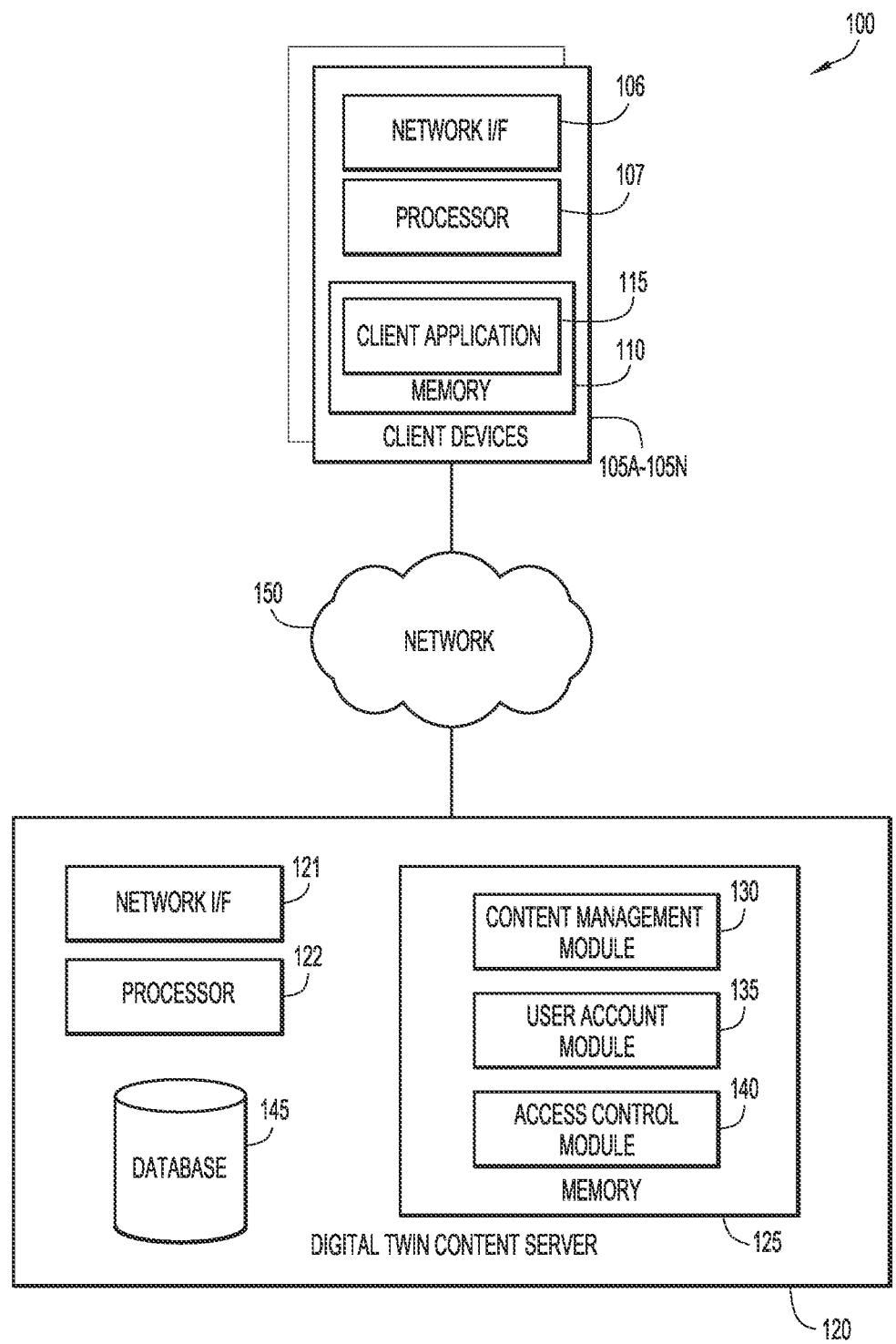
FIG. 1 is a block diagram depicting a computing environment for controlling access to virtual twin data in accordance with an embodiment of the present invention.

Present invention embodiments relate to data access, and more specifically, to controlling access to data objects with data having different access requirements. A digital twin is preferably a digital data object that can provide both the elements and the dynamics of how a physical object, such as an Internet of things (IoT) device, operates throughout its life cycle. A digital twin may be used to model a physical object by synchronizing the digital twin with its physical counterpart; for example, a digital twin can be provided with real-time data collected by or about a physical object. Thus, by maintaining a connection between a digital twin and a physical object, the physical object can be remotely tracked, tested, observed, and/or otherwise managed in real-time.

Just as a physical asset can contain components that are manufactured by an entity other than the manufacturer of the larger asset, a digital twin (or data object) can include a dependency that is itself another digital twin (or data object). For example, a digital twin corresponding to a vehicle may include another digital twin corresponding to an engine. As used herein, a primary digital twin (or primary data object) may refer to a digital twin (or data object) that includes one or more other digital twins (or data objects), and a secondary digital twin (or secondary data object) may refer to a digital twin (or data object) that is itself included in another digital twin (or data object).

A primary digital twin may be subject to a different ownership agreement than a secondary digital twin, despite the primary digital twin requiring access to the secondary digital twin in order for the primary twin to be utilized. In such cases, a user may be required to obtain permission, from multiple content providers, to access multiple digital twins in order to fully utilize a particular digital twin. However, obtaining access to and utilizing multiple digital twins can be complicated, especially when digital twins are subject to different and/or changing access requirements.

Thus, present invention embodiments enable a user to access a digital twin, whose data contains other digital twins, in a straightforward manner that automatically addresses all access concerns. Upon granting access to the multiple digital twins, the user may then provide data, collected by or from physical counterparts of the digital twins, in order to manage the physical counterparts in real-time. For example, management of digital twins can enable a windfarm to be remotely reconfigured in response to real-time observations to increase power output, while also identifying any actual or potential issues with respect to stress or strain experienced by component sub-assemblies. Accordingly, present invention embodiments provide the practical application of controlling access to digital twins in the face of ever-changing access requirements, dependencies, and ownership statuses, enabling end users to monitor, test, and manage physical objects in real-time and in response to any changes to digital twin data and/or metadata.

Various other embodiments of the present invention will now be discussed. In some embodiments, the one or more secondary data objects have different access requirements than the primary data object. Thus, present invention embodiments enable overall access requirements to a primary data object to be determined based not only on the access requirements of the primary data object, but also based on any secondary data objects upon which the primary data object depends. In some embodiments, the primary data object is provided to a content hosting service by a first content provider, and wherein the one or more secondary data objects are provided to the content hosting service by one or more second content provider. Thus, present invention embodiments manage access to data when the data includes differences between both the content providers and the access requirements of included data. In some embodiments, granting the entity access comprises providing an instance of the primary data object, including the one or more secondary data objects, to the entity. Thus, users can access data in order to model physical objects. In some embodiments, in response to granting the entity access, data collected by one or more sensors of the physical item corresponding to the primary data object is received, and the primary data object is updated with the received data. Thus, users can access data to manage, track, and test physical objects in real-time. In some embodiments, the one or more secondary data objects are further included in a third data object, and wherein satisfaction, by the entity, of the access requirements for the one or more secondary data objects in order to access the primary data object causes access requirements, for the one or more secondary data objects, to access the third data object to be satisfied. Thus, present invention embodiments control access to data when there are complex relationships among the dependencies. In some embodiments, satisfying the access requirements of the one or more secondary data objects causes the entity to satisfy access requirements for the one or more secondary data objects in a predetermined number of additional data objects in which the one or more secondary data objects are included. Thus, present invention embodiments enable a user to access data by automatically satisfying an access requirement for other data objects when the user has previously satisfied an access requirement for a contained data object. In some embodiments, the access requirements for the one or more secondary data objects are determined to have been modified, and the access requirements for the primary data object and the one or more secondary data objects are automatically updated. Thus, present invention embodiments automatically update access requirements of any affected data objects when content providers make changes to a related data object.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Present invention embodiments will now be described in detail with reference to the Figures. FIG. 1 is a block diagram depicting a computing environment 100 for controlling access to virtual twin data in accordance with an embodiment of the present invention. As depicted, computing environment 100 includes one or more client devices 105A-105N, a digital twin content server 120, and a network 150. It is to be understood that the functional division among components of computing environment 100 have been chosen for purposes of explaining present invention embodiments and is not to be construed as a limiting example.

Each client device 105A-105N includes a network interface (I/F) 106, at least one processor 107, and memory 110 that includes a client application 115. Each client device 105A-105N may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of each client device 105A-105N to send and receive data over a network, such as network 150. In general, each client device 105A-105N enables a user to interact with digital twin content server 120 in order to, e.g., access hosted digital twin data, provide digital twin data, update digital twin data, and/or define or update digital twin metadata in accordance with present invention embodiments. Each client device 105A-105N may include internal and external hardware components, as depicted and described in further detail with respect to FIG. 5.

Client application 115 may include one or more modules or units to perform various functions of present invention embodiments described below. Client application 115 may be implemented by any combination of any quantity of software and/or hardware modules or units, and may reside within memory 110 of client device 105 for execution by a processor, such as processor 107.

In some embodiments, client application 115 enables a user to access digital twin content server 120 in order to create or modify a digital twin. A digital twin can be created when a content provider provides digital twin data corresponding to a corresponding physical object or entity (e.g., the physical twin). Digital twin data can include data used to simulate functioning of a physical object or entity, including a virtual model of the physical object or entity, software to emulate execution of one or more processors of a physical object, software to emulate other performance of functions of a physical object, and the like. Digital twin data can also include a specification of the physical object or entity, and other data, such as digitalized user manuals, license agreements, term of use agreements, and the like. A digital twin may also include metadata, such as an ownership history, licensing history, usage history, and indications of any other digital twins included within the digital twin. Data corresponding to a primary digital twin may also include any data and/or metadata corresponding to any included secondary digital twin. Additionally or alternatively, a user may, via client application 115, access digital twin data hosted by digital twin content server 120 in order to modify digital twin data and/or metadata, including ownership data and dependency data (e.g., data describing a secondary digital twin being included in a primary digital twin).

In some embodiments, client application 115 enables a user to access digital twin content server 120 in order to access and utilize digital twin data. When a user account associated with client application 115 satisfies access requirements for a particular digital twin, then client application 115 may access the digital twin data. In various embodiments, access to digital twin data may include downloading digital twin data for local use, providing data to the digital twin that is obtained from or by a physical counterpart of the digital twin, executing one or more instances of a digital twin model to test, simulate, and/or manage a physical asset, and the like.

Digital twin content server 120 includes a network interface (I/F) 121, at least one processor 122, and memory 125. Memory 125 may include a content management module 130, a user account module 135, and an access control module 140. Digital twin content server 120 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 121 enables components of digital twin content server 120 to send and receive data over a network, such as network 150. In general, digital twin content server 120 and its modules enable the management of digital twin data, including controlling access to digital twins and enabling users to utilize digital twins in order to test, observe, and manage potential and/or actual physical counterparts. Digital twin content server 120 may include internal and external hardware components, as depicted and described in further detail with respect to FIG. 5.

Content management module 130, user account module 135, and access control module 140 may include one or more modules or units to perform various functions of present invention embodiments described below. Content management module 130, user account module 135, and access control module 140 may be implemented by any combination of any quantity of software and/or hardware modules or units, and may reside within memory 125 of digital twin content server 120 for execution by a processor, such as processor 122.

Content management module 130 manages a database of digital twin data and metadata, including virtual models of physical entities, digitalized versions of user manuals, license agreements, and the like, and metadata, including ownership data and data indicating the presence of any secondary digital twins contained within a primary digital twin. Each package of data corresponding to a digital twin can be provided to content management module 130 by a content provider via client application 115 of any of client devices 105A-105N. Similarly, a content provider may update digital twin data and/or metadata by indicating changes to a particular digital twin to content management module 130.

In some embodiments, content management module 130 manages a list of access requirements for each digital twin. Access requirements can be defined by a content provider of the digital twin, and can be based on a license agreement. The access requirements may include a price to license a digital twin, a list of entities permitted or not permitted to access a digital twin, and the like. When a digital twin is a primary digital twin that contains one or more secondary digital twins, content management module 130 may determine access requirements based on both the primary and one or more secondary digital twins. For example, if a primary digital twin is priced at a first value, and the primary digital twin depends upon a secondary digital twin that is priced at a second value, the overall value required in order to access the primary digital twin may be a sum of the first value and the second value. In some embodiments, an access requirement for a primary digital twin or a secondary digital twin may be defined according to a predetermined price value. For example, when a price value required to access a primary digital twin is increased by the content provider of the primary digital twin, content management module 130 automatically decreases the price value of the included secondary digital twin by a corresponding magnitude in order to offset the change and ensure that the sum of the values required to access the primary digital twin and the secondary digital twin remains constant.

Content management module 130 may store and update dependency information for each digital twin, including any other digital twins that contain a digital twin as well as any other digital twins contained by the digital twin. In some embodiments, content management module 130 automatically detects any changes to access requirements of a digital twin that is managed by content management module 130. In response to detecting a change to an access requirement of a digital twin, content management module 130 may analyze dependency information for the digital twin to identify whether the digital twin contains any secondary digital twins and/or whether the digital twin serves as a secondary digital twin within other primary digital twins. Next, content management module 130 may automatically update the access requirements for any identified assemblies in which the modified digital twin serves as a primary or secondary digital twin.

Content management module 130 may enable a user to access a model of a digital twin. One or more instances of a digital twin model may be executed by content management module 130 for simulation, testing, or monitoring of any physical twin associated with the digital twin. Content management module 130 may receive input data, which is collected from or by a physical entity, and provide that data into a digital twin model so that the digital twin model mirrors, in real-time, any current condition, functioning, or other desired aspect of the physical entity. For example, sensor data collected by a turbine, such as flow rate or temperature data, may be provided to a digital twin model of the turbine in order to monitor performance, identify any potential issues, and the like.

User account module 135 manages a database of user accounts for entities and corresponding digital twins to which each user account has access. When a user satisfies the access requirements of a particular digital twin, user account module 135 may update the user account data accordingly to indicate that the user may access the digital twin. User account module 135 may receive an indication that a user has satisfied an access requirement for a particular digital twin from access control module 140. When digital twin content server 120 receives a request for a user to access digital twin data, user account module 135 may determine whether the user has access to the requested digital twin data, and may then provide access to the requested digital twin data (e.g., via content management module 130).

Access control module 140 processes user-provided data to determine whether a user account can access a particular digital twin based on the access requirements of the digital twin. User-provided data may include an identity of the entity associated with a user account, which can be an individual or an organization. Additionally or alternatively, user-provided data may include payment information that enables access control module 140 to receive payment from a user and provide the payment to a content provider associated with a digital twin. When a user submits data in order to fulfill an access requirement for a digital twin, access control module 140 verifies that the submitted data satisfies the access requirement, and once the access requirement is determined to be satisfied, access control module 140 may indicate satisfaction of the access requirement to user account module 135. In response to receiving an indication that an access requirement has been satisfied, user account module 135 may update the access permissions of the appropriate user account accordingly.

Database 145 may include any non-volatile storage media known in the art. For example, database 145 can be implemented with a tape library, optical library, one or more independent hard disk drives, or multiple hard disk drives in a redundant array of independent disks (RAID). Similarly, data in database 145 may conform to any suitable storage architecture known in the art, such as a file, a relational database, an object-oriented database, and/or one or more tables. In some embodiments, database 145 may store data related to digital twins, including digital twin data (e.g., CAD data, models of digital twins, digitized documents, etc.), digital twin metadata (e.g., ownership data, access requirement data, digital twins included within a digital twin, etc.), data relating to the physical twins that correspond to digital twins (e.g., sensor data), user account data (e.g., identity data, previously-satisfied access requirements), and the like.

Network 150 may include a local area network (LAN), a wide area network (WAN) such as the Internet, or a combination of the two, and includes wired, wireless, or fiber optic connections. In general, network 150 can be any combination of connections and protocols known in the art that will support communications between client devices 105A-105N and digital twin content server 120 via their respective network interfaces in accordance with embodiments of the present invention.

Figure 2A:
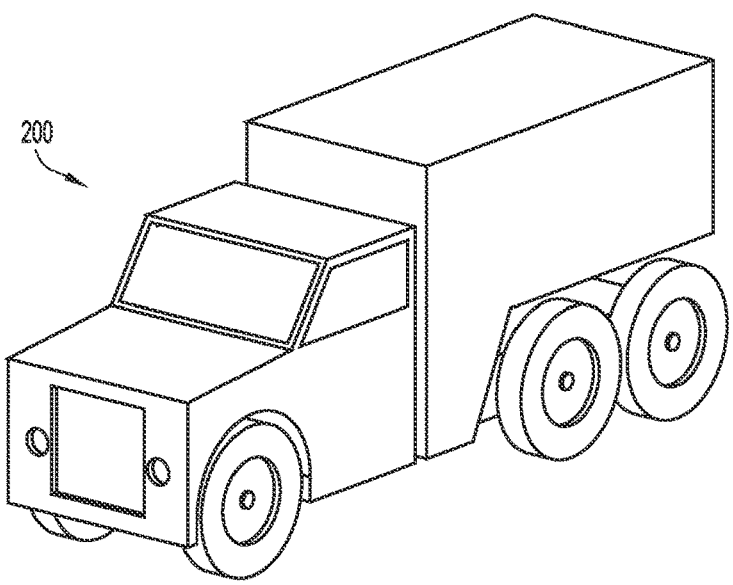
FIG. 2A is diagram depicting a physical twin in accordance with an embodiment of the present invention.

FIG. 2A is diagram depicting a physical twin 200 in accordance with an embodiment of the present invention. In the depicted example, physical twin 200 is a vehicle (e.g., a truck, etc.); however, a physical twin can include any object or entity, including both living and non-living entities, such as a mechanical device, an organism, a system, a computing network, a utility network, a factory, a motor, a semiconductor, and the like. A physical twin may include one or more sensors to collect data about the physical twin and/or its environment, or sensors may be disposed near a physical twin to observe the physical twin and to collect data.

Figure 2B:
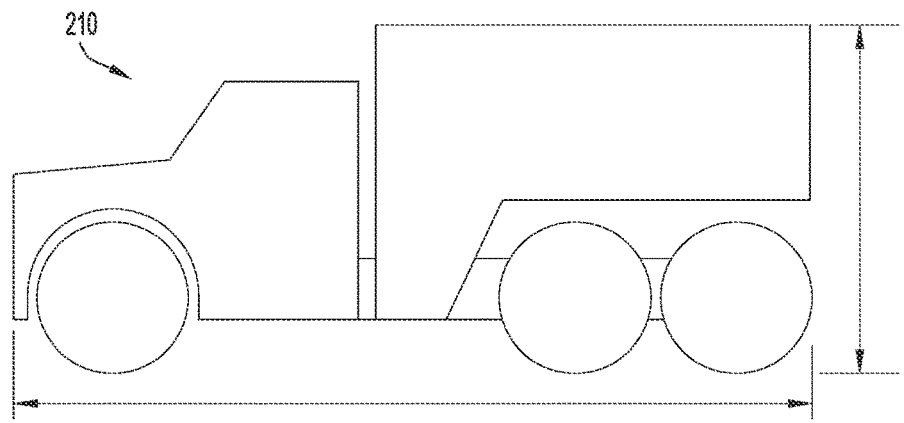
FIG. 2B is a schematic diagram depicting a representation of a primary digital twin in accordance with embodiments of the present invention.

FIG. 2B is a schematic diagram depicting a representation of a primary digital twin in accordance with embodiments of the present invention. As depicted, digital twin 210 is a primary digital twin whose physical counterpart corresponds to physical twin 200 of FIG. 2A. Digital twin 210 may include a CAD drawing, a virtual model, and/or any other digitized versions of components of physical twin 210. As a primary digital twin, digital twin 210 includes data that corresponds to one or more other digital twins.

Figure 2C:
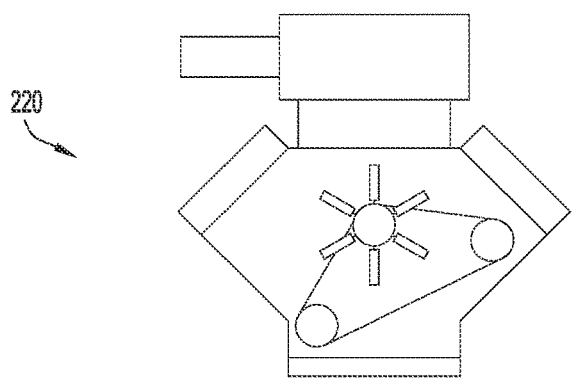
FIG. 2C is a schematic diagram depicting a representation of a secondary digital twin in accordance with embodiments of the present invention.

FIG. 2C is a schematic diagram depicting a representation of a secondary digital twin 220 in accordance with embodiments of the present invention. In the depicted example, digital twin 220 is a secondary digital twin of primary digital twin 210. For example, secondary digital twin 220 is an engine, which is incorporated into primary digital twin 210. Thus, the physical twin of secondary digital twin 220 is the engine component of physical twin 210 (i.e., an engine that is included in a truck).

Primary digital twin 210 and secondary digital twin 210 may be subject to different access requirements. For example, the manufacturer of physical twin 200 may purchase and include an engine from another organization; as such, primary digital twin 210 may be property of the manufacturer of physical twin 200, whereas digital twin 220 may be property of the manufacturer of the engine. In such a case, when a user desires to access and utilize primary digital twin 210 in accordance with present invention embodiments, the user must obtain permission from the owner of primary digital twin 210 to utilize primary digital twin 210, and additionally, the user must obtain permission to utilize secondary digital twin 220 from the owner of secondary digital twin 220. Thus, the user would have to satisfy access requirements of both primary digital twin 210 and secondary digital twin 220 in order to fully access and utilize primary digital twin 210.

Figure 3:
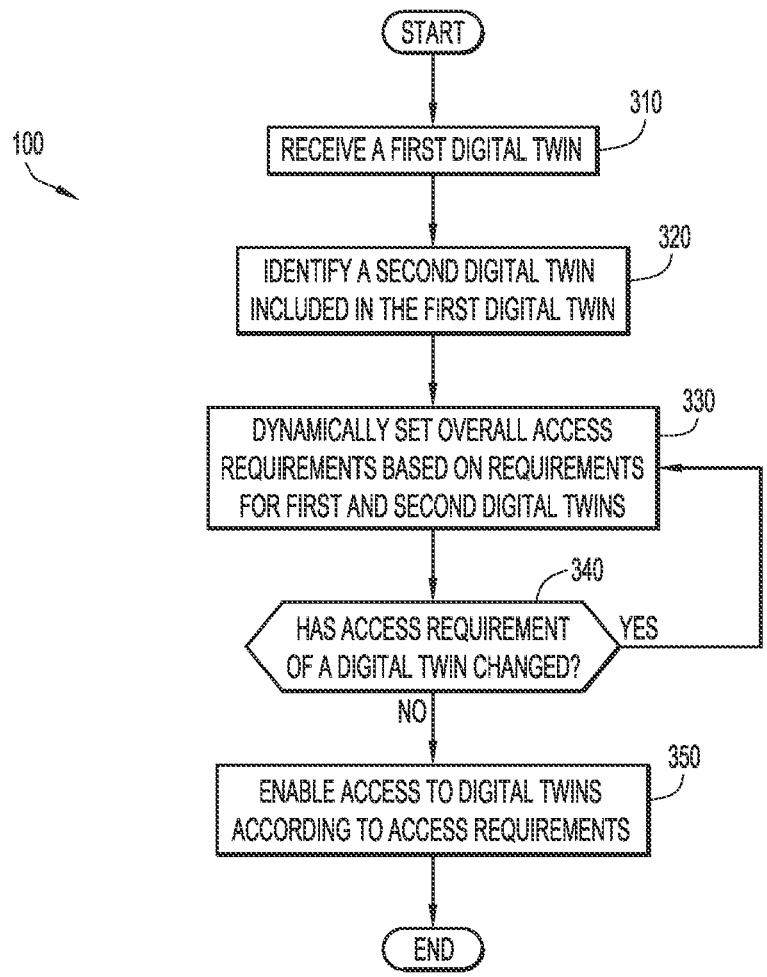
FIG. 3 is a flow chart depicting a method of managing digital twin data in accordance with an embodiment of the present invention.

FIG. 3 is a flow chart depicting a method 300 of managing digital twin data in accordance with an embodiment of the present invention.

A first digital twin is received at operation 310. A content provider may access digital twin content server 120 using client application 115 of any of client devices 105A-105N in order to provide data corresponding to the first digital twin. The first digital twin may include any digital analogue of a physical entity, including a model of a physical object or entity, computer-aided design (CAD) drawings, executable modules such as machine learning models or predictive models, usage data, such as Internet of Things (IoT) and/or other sensor readings, digital versions of a user manual, bill of material, warranty, fault codes, specification, maintenance plans, scheduled maintenance plans, operating manuals, history, and the like. A digital twin may include metadata, such as an ownership history, licensing history, usage history, access requirements, and indications of any other digital twins included in the digital twin, along with data and metadata corresponding to the included digital twins.

A second digital twin that is included in the first digital twin is identified at operation 320. When content management module 130 adds the first digital twin to a digital twin database (e.g., database 145), content management module 130 may identify any other digital twins included within the data of the first digital twin. The second digital twin may be explicitly identified by the data or metadata of the first digital twin, or content management module 130 may identify the presence of a second digital twin based on other techniques. For example, the data of a first digital twin can be analyzed to identify any portions of data that match the data known to be associated with another digital twin. As another example, files within a digital twin can be converted to hashes, and the hashes can be compared against an index of hashes of other digital twins.

The overall access requirements are dynamically established based on the access requirements for each of the first and second digital twins at operation 330. Access requirements are initially determined for each digital twin, and may include a list of entities or uses who are permitted and/or not permitted to access a particular digital twin. Access requirements may indicate whether a particular digital twin is open source, free, restricted to specific entities, available only to specific entities, require explicit written or other approval by an entity, and the like. Additionally or alternatively, access requirements can include a fee that must be paid by or on behalf of a user in order for the user to license a digital twin.

In order to establish the overall access requirements, the access requirements for each of the first and second digital twins may be combined. For fee-based access requirements, the overall fee required to access the first digital twin and the included second digital twin may vary based on an agreement between the content provider of the first digital twin and content provider of the second digital twin. In some embodiments, the values of the fees required to access the first and second digital twin are summed to provide an overall fee to access the first digital twin, and by extension, the second digital twin. In some embodiments, the overall fee is defined as a predetermined value, and the individual fees to access the first and second digital twin are adjusted accordingly so that their sum matches the predetermined value. In some embodiments, a primary and/or secondary digital twin may have a maximum price. In some embodiments, the overall fee required to access a bundled primary digital twin and secondary digital twin may be defined as a certain percentage greater than the access fee for the secondary digital twin. In some embodiments, the fee required to access a secondary digital twin may be one value if access is sought for a stand-alone version of the secondary digital twin, and a different value when access to the secondary digital twin is requested due to the inclusion of the secondary digital twin in a primary digital twin.

In some embodiments, overall access requirements may be determined for physical objects that include dependencies upon other physical objects, which are subject to different ownerships and/or access requirements. A customized assembly may be provided by a first entity that includes constituent elements belonging to other entities. For example, a customized gift basket, assembled by one entity, may include apples, oranges, pears, cheese, and nuts that each belong to a different one or more entities. When a user purchases the customized assembly, the overall access requirements may include an aggregation of the individual access requirements for each physical constituent element.

Operation 340 determines whether an access requirement of a digital twin has changed. If any access requirements of a primary digital twin and/or an included secondary digital twin have changed, then the overall access requirements are dynamically adjusted at operation 330. In some embodiments, when the value of the fee for a primary and/or secondary digital twin changes, the overall fee is updated to equal the sum of the adjusted fee values. In some embodiments, when the overall fee is a predetermined value, an increase or decrease to a fee for a digital twin may automatically cause a commensurate decrease or increase to the fee of any bundled primary or secondary digital twin.

For example, an overall fee to license a primary digital twin may be defined as $100, with $50 being an access requirement established by the content owner of the primary digital twin and the remaining $50 being an access requirement established by the content owner of the secondary digital twin; when the secondary digital twin's price is adjusted to $60, the access requirement for the primary digital twin may accordingly and automatically be adjusted to equal $40. In some embodiments, each content provider receives a predetermined share (i.e. percentage) of the overall fee, so any adjustment to the overall fee changes the magnitude of the compensation for each content provider.

In some embodiments, when a content provider modifies an access requirement of a digital twin, any users who have previously satisfied the access requirements of that digital twin may be notified. Additionally or alternatively, when a content provider modifies an access requirement of a digital twin, another content provider may be notified when the content provider owns a digital twin that includes, or is included by, the digital twin whose access requirements have been modified.

When no access requirements have been modified, access to the bundled digital twins is enabled according to the access requirements at operation 350. Access control module 140 may confirm that the user account requesting access to the primary and secondary digital twins has satisfied all access requirements. The appropriate content providers may be compensated using data provided by the user to satisfy the access requirements. For example, access control module 140 may transfer funds or cryptocurrency to a content provider, or may provide the content provider with information sufficient to send an invoice to the entity associated with the user account.

In some embodiments, when the overall access requirements for a physical entity that includes dependencies upon other physical entities are satisfied, the assembly of all required physical assemblies may be delivered to the entity satisfying the access requirements. The overall access requirements may be presented to a user as a singular access requirement; for example, the access requirements for a gift basket may include a merger of individual access requirements for the apples, oranges, pears, cheese, and nuts included in the gift basket. The physical assembly can be delivered as individual components by the entity associated with each component, or may be assembled by another entity, such as the entity listing the assembly in the twin marketplace.

Figure 4:
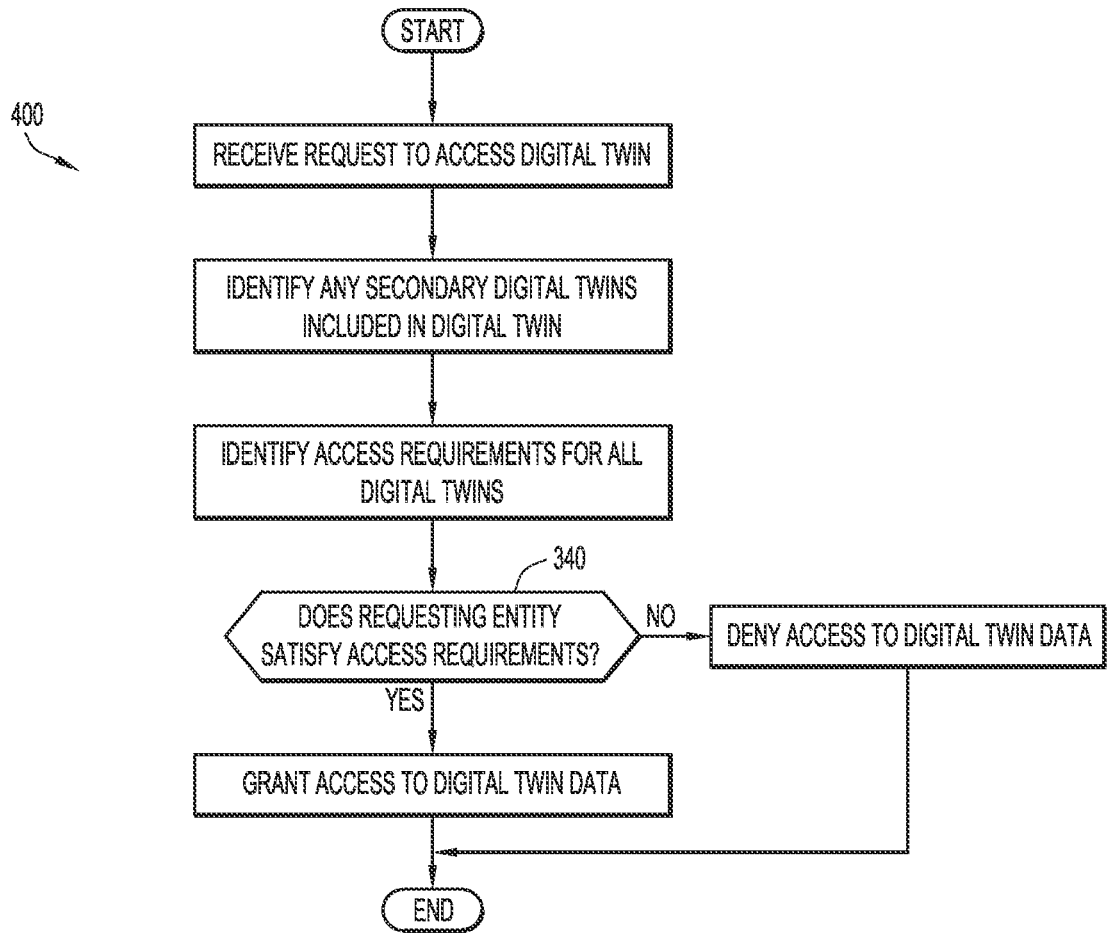
FIG. 4 is a flow chart depicting a method of controlling access to digital twin data in accordance with an embodiment of the present invention.

FIG. 4 is a flow chart depicting a method 400 of controlling access to digital twin data in accordance with an embodiment of the present invention.

A request to access a digital twin is received at operation 410. Digital twin content server 120 may host a digital twin marketplace or repository that can be accessed and browsed by client application 115 of client devices 105A-105N. When a user wants to access a particular digital twin, the user may initiate, via client application 115, a request to access the selected digital twin.

Any secondary digital twins that are included in the digital twin are identified at operation 420. For example, content management module 130 may determine that the requested digital twin is a primary digital twin, and contains a secondary digital twin subject that is controlled by a different content provider than the primary digital twin.

The access requirements for all digital twins are identified at operation 430. Access control module 140 may determine the overall access requirements for the primary digital twin and secondary digital twin, including any access requirements relating to the identity of the requesting entity, and any access requirements relating to licensing fees.

Operation 440 determines whether the requesting entity satisfies all of the access requirements for the digital twins. In some embodiments, the requesting entity may already satisfy one or more of the access requirements prior to placing the access request. For example, the requesting entity's user account may have previously satisfied the access requirements of a secondary digital twin, and thus needs only to satisfy the access requirements of the primary digital twin in order to access the requested data. In some embodiments, the license agreement for a digital twin may stipulate a particular number of uses of that digital twin as part of other primary digital twins. For example, a license obtained by a user to access a secondary digital twin may grant the user permission to access that digital twin as part of two additional, different primary digital twins that each include the same secondary digital twin.

When access control module 140 determines that a user account meets all of the overall access requirements for the primary and secondary digital twin, access is granted to the digital twin data at operation 450. However, when any access requirement for a primary and secondary digital twin are not currently satisfied by a user, access to the digital twin data is denied at operation 460. When a request to access data is denied, access control module 140 may identify and present the remaining unsatisfied access requirements to the user so that the user can provide additional input sufficient to meet the remaining access requirements. Once a user obtains access to digital twin data, the user may download the digital twin data, access and/or execute digital twin models, provide data relating to a physical twin of the digital twin, and the like.

Figure 5:
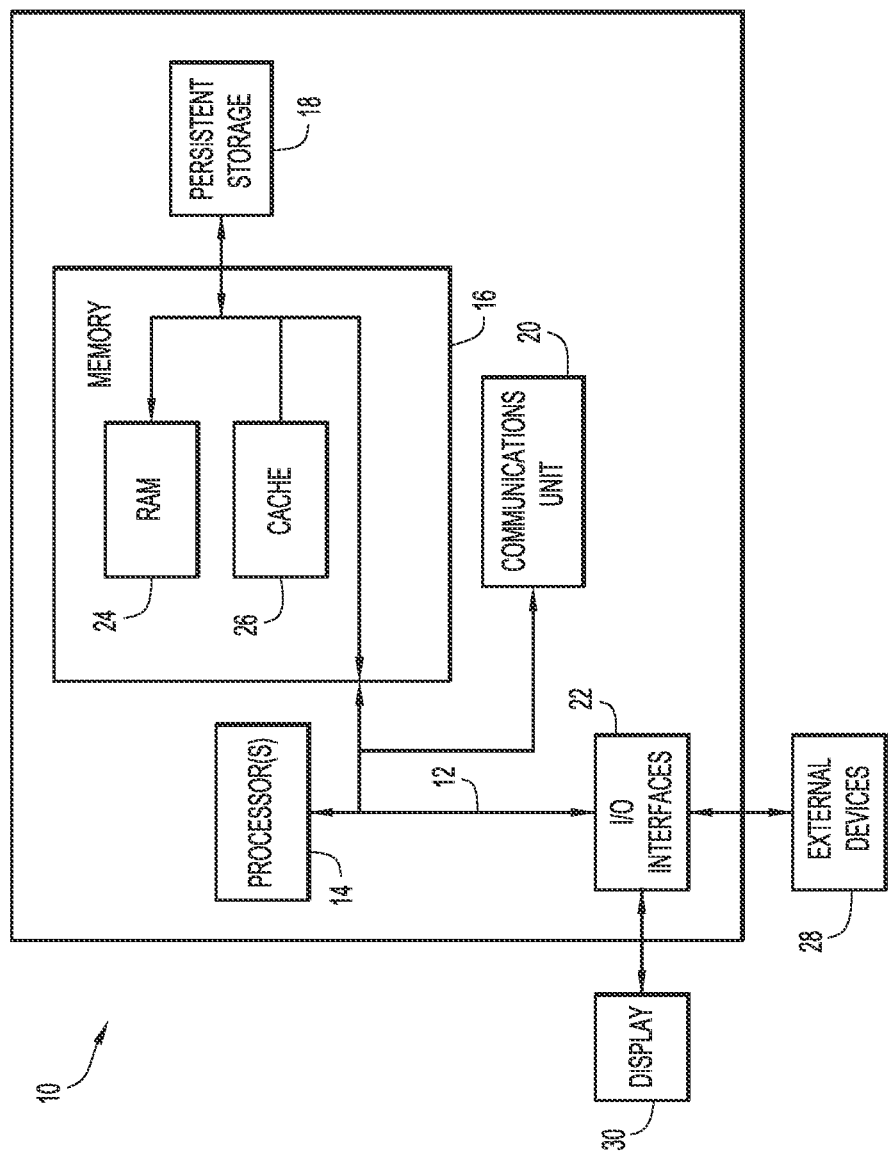
FIG. 5 is a block diagram depicting a computing device in accordance with an embodiment of the present invention.

FIG. 5 is a block diagram depicting components of a computer 10 suitable for executing the methods disclosed herein. Computer 10 may implement client device 105 and/or digital twin content server 120 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to digital twin management and physical entity modeling (e.g., digital twin data (e.g., CAD data, models of digital twins, digitized documents, etc.), digital twin metadata (e.g., ownership data, access requirement data, indications of any digital twins included within a digital twin, etc.), data relating to the physical twins that correspond to digital twins (e.g., sensor data), user account data (e.g., identity data, previously-satisfied access requirements), etc.) may be stored within any conventional or other data structures (e.g., files, arrays, lists, stacks, queues, records, etc.) and may be stored in any desired storage unit (e.g., database, data or other repositories, queue, etc.). The data transmitted between client devices 105A-105N and digital twin content server 120 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to digital twin management and physical entity modeling (e.g., digital twin data (e.g., CAD data, models of digital twins, digitized documents, etc.), digital twin metadata (e.g., ownership data, access requirement data, indications of any digital twins included within a digital twin, etc.), data relating to the physical twins that correspond to digital twins (e.g., sensor data), user account data (e.g., identity data, previously-satisfied access requirements), etc.) may include any information provided to, or generated by, client devices 105A-105N and/or digital twin content server 120. Data relating to digital twin management and physical entity modeling may include any desired format and arrangement, and may include any quantity of any types of fields of any size to store any desired data. The data relating to digital twin management and physical entity modeling may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to digital twin management and physical entity modeling), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of improving the access control to data models used to track and/or simulate any desired physical entities.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, client application 115, content management module 130, user account module 135, access control module 140, etc.). These systems may include any types of monitors and input devices (e.g., keyboard, mouse, voice recognition, etc.) to enter and/or view information.

It is to be understood that the software (e.g., communications software, server software, client application 115, content management module 130, user account module 135, access control module 140, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, client application 115, content management module 130, user account module 135, access control module 140, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to digital twin management and physical entity modeling). The database system may be implemented by any number of any conventional or other databases, data stores or storage structures (e.g., files, databases, data structures, data or other repositories, etc.) to store information (e.g., data relating to digital twin management and physical entity modeling). The database system may be included within or coupled to the server and/or client systems. The database systems and/or storage structures may be remote from or local to the computer or other processing systems, and may store any desired data (e.g., data relating to digital twin management and physical entity modeling).

The present invention embodiments may employ any number of any type of user interface (e.g., Graphical User Interface (GUI), command-line, prompt, etc.) for obtaining or providing information (e.g., data relating to digital twin management and physical entity modeling), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, controlling access to data objects that contain other data objects with differing and/or changing access requirements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for controlling access to data comprising:
   receiving a request from an entity to access data comprising a primary data object corresponding to a physical item;
   identifying one or more secondary data objects included in the primary data object, wherein the one or more secondary data objects correspond to physical components of the physical item, wherein the physical components are constituent elements of the physical item, wherein the primary data object is provided to a content hosting service by a first content provider, and wherein the one or more secondary data objects are provided to the content hosting service by one or more second content providers;
   determining access requirements for the primary data object and the one or more secondary data objects, wherein the one or more secondary data objects have different access requirements than the primary data object;
   in response to determining that the access requirements are satisfied by the entity, granting the entity access to the data comprising the primary data object and the one or more secondary data objects, wherein granting the entity access comprises providing an instance of the primary data object, including the one or more secondary data objects, to the entity;
   determining that the access requirements for the one or more secondary data objects have been modified;
   automatically updating the access requirements for the primary data object and the one or more secondary data objects; and
   automatically updating the access requirements for one or more additional primary data objects in which the one or more secondary data objects are included based on the modified access requirements for the one or more secondary data objects.

2. The computer-implemented method of claim 1, further comprising:
   in response to granting the entity access, receiving data collected by one or more sensors of the physical item corresponding to the primary data object; and
   updating the primary data object with the received data.

3. The computer-implemented method of claim 1, wherein the one or more secondary data objects are further included in a third data object, and wherein satisfaction, by the entity, of the access requirements for the one or more secondary data objects in order to access the primary data object causes access requirements, for the one or more secondary data objects, to access the third data object to be satisfied.

4. The computer-implemented method of claim 1, wherein satisfying the access requirements of the one or more secondary data objects causes the entity to satisfy access requirements for the one or more secondary data objects in a predetermined number of additional data objects in which the one or more secondary data objects are included.

5. A computer system for controlling access to data, the computer system comprising:
   one or more computer processors;
   one or more computer readable storage media;
   program instructions stored on the one or more computer readable storage media for execution by at least one of the one or more computer processors, the program instructions comprising instructions to:
   receive a request from an entity to access data comprising a primary data object corresponding to a physical item;
   identify one or more secondary data objects included in the primary data object, wherein the one or more secondary data objects correspond to physical components of the physical item, wherein the physical components are constituent elements of the physical item, wherein the primary data object is provided to a content hosting service by a first content provider, and wherein the one or more secondary data objects are provided to the content hosting service by one or more second content providers;

determine access requirements for the primary data object and the one or more secondary data objects, wherein the one or more secondary data objects have different access requirements than the primary data object;

in response to determining that the access requirements are satisfied by the entity, grant the entity access to the data comprising the primary data object and the one or more secondary data objects, wherein granting the entity access comprises providing an instance of the primary data object, including the one or more secondary data objects, to the entity;

determining that the access requirements for the one or more secondary data objects have been modified;

automatically updating the access requirements for the primary data object and the one or more secondary data objects; and automatically updating the access requirements for one or more additional primary data objects in which the one or more secondary data objects are included based on the modified access requirements for the one or more secondary data objects.

6. The computer system of claim 5, wherein the program instructions further comprise instructions to:

in response to granting the entity access, receive data collected by one or more sensors of the physical item corresponding to the primary data object; and update the primary data object with the received data.

7. The computer system of claim 5, wherein the one or more secondary data objects are further included in a third data object, and wherein satisfaction, by the entity, of the access requirements for the one or more secondary data objects in order to access the primary data object causes access requirements, for the one or more secondary data objects, to access the third data object to be satisfied.

8. The computer system of claim 5, wherein satisfying the access requirements of the one or more secondary data objects causes the entity to satisfy access requirements for the one or more secondary data objects in a predetermined number of additional data objects in which the one or more secondary data objects are included.

9. A computer program product for controlling access to data, the computer program product comprising one or more non-transitory computer readable storage media collectively having program instructions embodied therewith, the program instructions executable by a computer to cause the computer to:

receive a request from an entity to access data comprising a primary data object corresponding to a physical item;

identify one or more secondary data objects included in the primary data object, wherein the one or more secondary data objects correspond to physical components of the physical item, wherein the physical components are constituent elements of the physical item, wherein the primary data object is provided to a content hosting service by a first content provider, and wherein the one or more secondary data objects are provided to the content hosting service by one or more second content providers;

determine access requirements for the primary data object and the one or more secondary data objects, wherein the one or more secondary data objects have different access requirements than the primary data object;

in response to determining that the access requirements are satisfied by the entity, grant the entity access to the data comprising the primary data object and the one or more secondary data objects, wherein granting the entity access comprises providing an instance of the primary data object, including the one or more secondary data objects, to the entity;

determining that the access requirements for the one or more secondary data objects have been modified;

automatically updating the access requirements for the primary data object and the one or more secondary data objects; and automatically updating the access requirements for one or more additional primary data objects in which the one or more secondary data objects are included based on the modified access requirements for the one or more secondary data objects.

10. The computer program product of claim 9, wherein the program instructions further cause the computer to:

in response to granting the entity access, receive data collected by one or more sensors of the physical item corresponding to the primary data object; and update the primary data object with the received data.

* * * * *